United States Patent Office 3,295,026
Patented Dec. 27, 1966

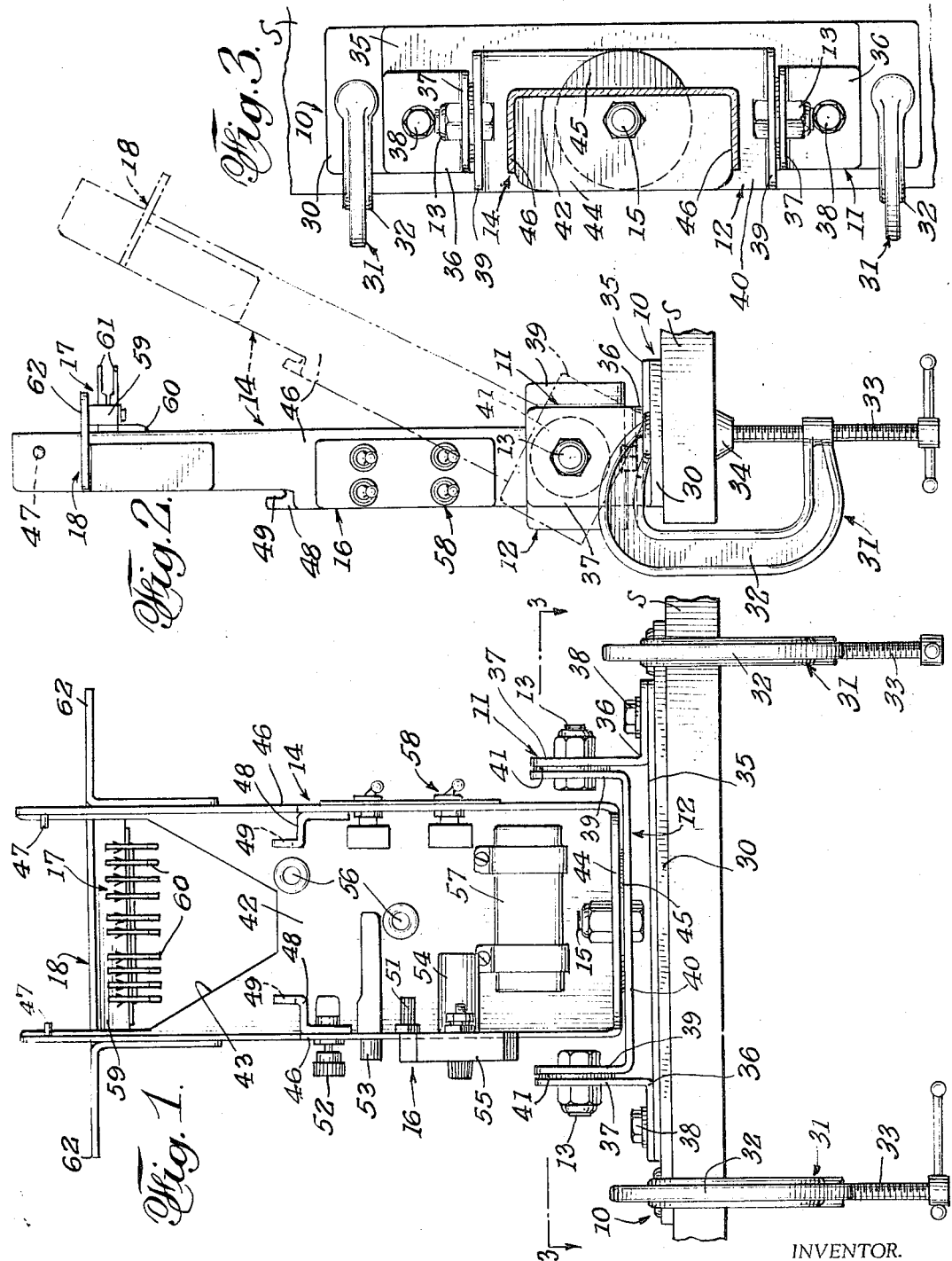

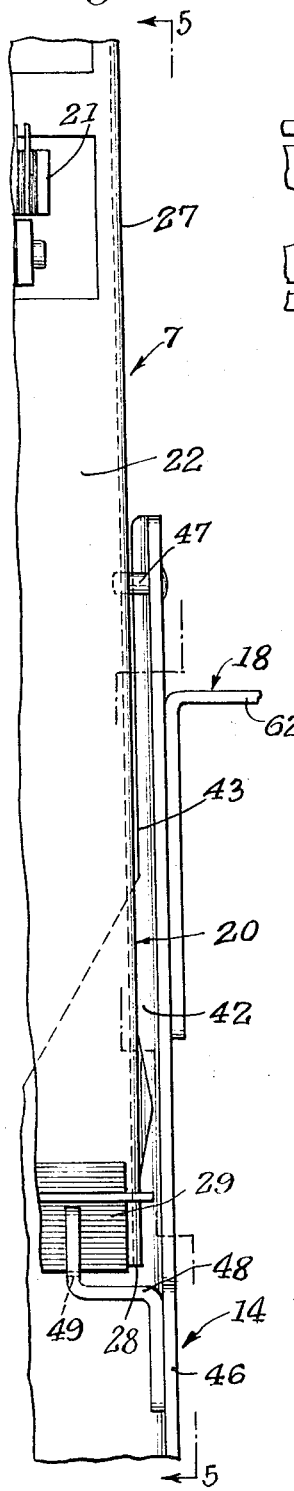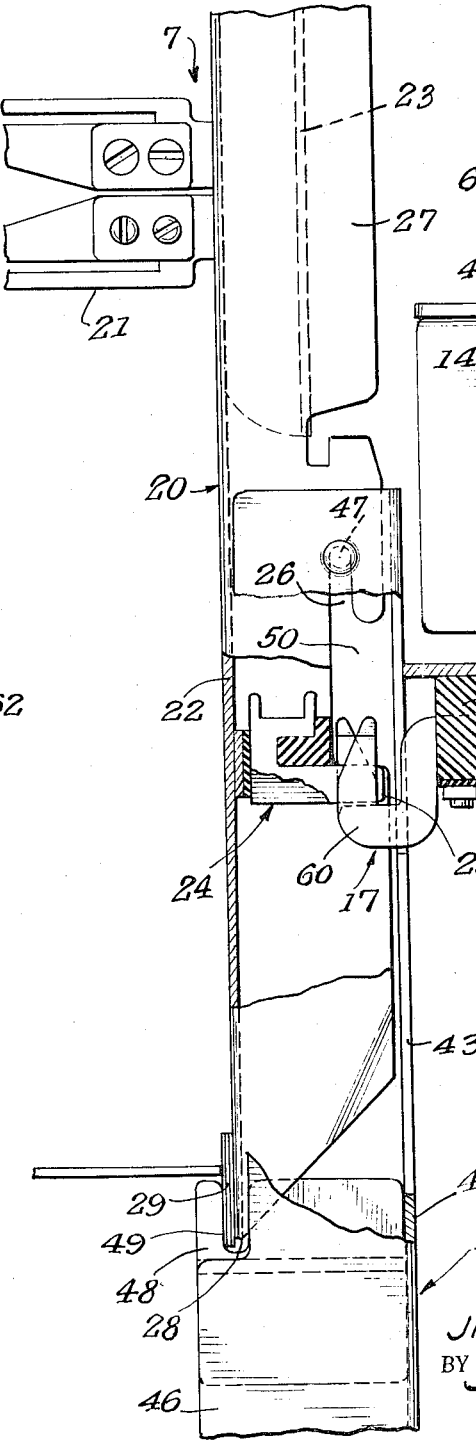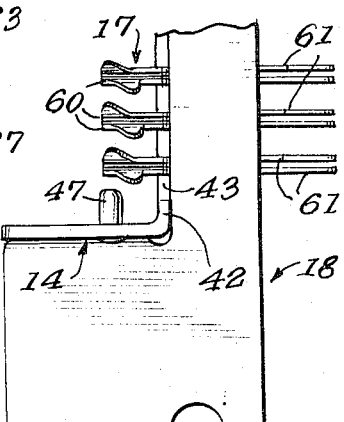

3,295,026
TEST STAND
Jim C. Garrett, Inglewood, Calif.
(8060 Salt Ave., Huntington Park, Calif. 90255)
Filed Mar. 7, 1966, Ser. No. 532,245
7 Claims. (Cl. 317—112)

This invention relates to a test stand for holding an electro-mechanical device for modification and/or testing. One type of device contemplated to be so held is a Strowger switch such as commonly used in the telephone industry in both incoming and outgoing lines.

An object of the invention is to provide a test stand for safely holding such a switch so the same is rotatable a full 360° and also is tiltable to considerable forward and backward angles, thereby enabling switches of the type that include line finders, selectors (including toll transmission), connectors, and repeaters to be serviced safely and easily, since all electro-mechanical parts of the switch are clearly visible while being firmly supported.

Another object of the invention is to provide a test stand, as above characterized, that holds a Strowger-type switch so its rear cover plate may be removed without taking the switch out of the stand, thereby affording easy access to the parts covered by said plate without danger of damage thereto.

A further object of the invention is to provide a test stand that is fitted with electrical testing equipment and with a switch jack to which said equipment is electrically connected, said jack effecting electrical connection with electrical terminals provided on the Strowger or other switch mounted on the stand for test, when the same has been mounted in test position. Thus, by merely mounting a switch on the stand, the same is automatically connected in electrical circuit with said testing equipment.

A still further object of the invention is to provide a test stand, as above, provided with novel, simplified means for mounting the same in firm operative position.

This invention also has for its objects to provide such means that are positive in operation, convenient in use, easily installed in a working position and easily disconnected therefrom, economical of manufacture, relatively simple, and of general superiority and serviceability.

The above objects are realized in a test stand structure that has a base that is adapted to be permanently bolted in place or, alternatively to be fitted with clamp means by which the same may be removably yet firmly mounted. Said stand structure is mounted to be forwardly or rearwardly tilted to an angle of about 25° and also to be rotatively adjusted on a vertical axis through a full 360°. Near its upper end, said stand is provided with a multi-prong switch jack which is wired to a multiplicity of test means, such as suitable toggle switches, a network, fuse block, connecting block, stepping button, stepping jack, and the like. Means, such as mounting brackets, and mounting pins, are provided for effecting separable connection to a Strowger or like switch which is provided with a bank of electrical terminals that effect electrical connection with the prongs of the mentioned switch jack and, therefore to the above-listed test means. It is a feature of the invention that the switch to be tested is inserted into the test stand by being slipped thereinto from above to effect connection with the mounting brackets and pins and the switch jack and requiring no further fastener application to hold the switch firmly affixed to the stand. After repair and test, the switch is simply removed by pulling the same upwardly. There are no wires to be disconnected or bolts or screws to be removed. Thus, it will be clear that a switch for test is merely mounted and removed much in the manner of a plug and jack commonly used in electrical circuitry.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a front elevational view of a test stand according to the present invention, shown clamped upon a support.

FIG. 2 is a side elevational view as seen from the right of FIG. 1.

FIG. 3 is a cross-sectional view as taken on the line 3—3 of FIG. 1.

FIG. 4, to an enlarged scale, is a front view of a fragmentary portion of said stand, showing the manner of its connection with a Strowger switch.

FIG. 5 is a vertical sectional view as taken on the line 5—5 of FIG. 4.

FIG. 6 is a broken plan view of the right side of the stand, drawn to the scale of FIGS. 4 and 5.

The switch 7 that is shown in a fragmentary manner in FIGS. 4 and 5, represents a Strowger switch. This term will hereafter be used to designate any similar switch or one for the same purpose used in the telephone industry for incoming and outgoing lines.

The test stand that is shown comprises, generally, a portable base 10 adapted to be removably mounted on a support S, as a workbench, table, cart or rolling ladder base, a support bracket 11 adapted, alternatively, to be fixedly mounted directly on a support or removably mounted on such a support by the portable base 10, a tilt bracket 12 mounted on the bracket 11 on aligned bolts 13 arranged on a horizontal axis, a switch stand 14 mounted on the bracket 12 on a bolt 15 arranged on a vertical axis, a complement of testing means 16 mounted on the switch stand 14, and a switch jack 17 mounted on the upper portion of said stand by means of an accessory bracket 18.

The switch 7, per se, forms no part of this invention. The same comprises a housing 20 which carries a variety of instrumentalities, represented by the relay 21, some of which extend forwardly from the wall 22 of said housing and some of which are covered over by a removable back plate 23. Among the instrumentalities are line finders, selectors (including toll transmission), connectors and repeaters, as well as means for stepping the switch, relays and other accessory items. The wall 22, on its inner face, beyond the end of the back plate 23, is provided with a bank of terminals 24 which are electrically wired to the instrumentalities represented by the relay 21. The terminals 24 extend rearwardly, as shown at 25 in FIG. 5. The above-described switch 7 is mounted in its operating environment by means of bayonet slots 26 formed in the side walls 27 of said housing 20. Two or more such slots 26 are ordinarily provided in each wall 27 but only the lower slot of each wall, as shown, is used for effecting connection with the switch stand 14. At its lower end 28, a non-metallic wear strip 29 is affixed to the wall 22, the same preferably extending beyond said wall end 28, as shown in FIGS. 4 and 5.

The portable base 10 is shown as a flat plate 30 on the opposite ends of which are permanently affixed yoke-type clamps 31, the yokes 32 having one end brazed to said plate and having the opposite end fitted with a clamp screw 33. It will be clear that a support S may be clamped between said plate 30 and the heads 34 of said screws 33.

The support bracket 11 is shown as a plate 35 on the ends of which are brazed angles 36 to provide spaced, parallel, upright ears 37. The bolts 38 are used for securing the bracket 11 to the plate 30, when a base 10 is used or alternatively, bolts similar to and longer than the bolts 38, may be substituted for securing said bracket 11 directly to the support S.

The tilt bracket 12 comprises a U-shaped member having a pair of opposite ears 39 connected by a horizontal plate 40. Said bracket 12 is arranged as a saddle with its ears 39 extending upwardly inward of the ears 37 with Teflon washers 41 between the pairs of each at each end. The bolts 13 extend through said ears and washers and provide an axis on which the bracket 12 may be tilted, as suggested, by the dot-dash lines of FIG. 2. In this structure the angle of tilt is 25° on each side of the vertical. Said bolts use stop nuts to enable desired application of friction on the washers 41 so the angle of tilt is retained, as set.

The switch stand 14 is shown as an elongated housing member having a rear wall 42, part of which is removed as at 43, to afford access from the rear to the lower portion of the switch housing 20, a bottom wall 44 that is superposed over the bracket plate 40 with a Teflon washer 45 therebetween, and side walls 46 which, together with the rear wall 42, form a channel section, as in FIG. 3. The bolt 15 connects the plate 40 and wall 44, the stop nut thereon frictionally clamping the washer 45. It will be seen that the stand 14 may be turned on the axis of bolt 15 and may be set at any angle through the entire 360° range of adjustment.

As best shown in FIGS. 4 and 5, the previously mentioned bayonet slots 26 in the side walls of the Strowger switch 7 may be engaged by pins 47 extending inwardly from the upper end of the side walls 46 of the switch stand 14. A mounting bracket 48 is fixedly provided on the inner face of each side wall 46, a slot 49 in each said bracket being adapted to receive the end 28 of the switch housing wall 20 and the wear strip 29 secured thereto.

Due to the widened space 50 below each bayonet slot 26, the switch 7 may be slid into connection with the switch stand 14 holding the upper end of said switch 7 at a level at which the pins 47 reside in spaces 50, then sliding the switch downwardly so the slots 26 are caught on the pins 47 and the trip 29 enters the slots 49 of mounting brackets 48. FIGS. 4 and 5 show this connected position in which the switch 7 is firmly held as an upward extension of the switch stand 14.

The testing means 16 may vary according to the requirements for testing the switch 7. In this case, the switch stand 14 is provided with a stepping jack 51, a stepping button 52, battery and ground jacks 53, a fuse block 54, an external battery and ground connecting block, suitable grommets, holes and clamps 56 for permanent wiring to a power source, a network unit 57, and a group of toggle switches 58 for master battery, network, and Selsen battery and ground requirements and control.

The switch jack 17 is shown as an insulation block 59, and a complement of spring prongs 60 carried by said block and provided with rearwardly directed terminals 61 to which the above-mentioned testing means 16 are wired, thereby connecting the prongs 60 to said testing means. It will be seen from FIG. 5, that said prongs 60 are located so as to be electrically engaged by the rearward extensions 25 of the bank of terminals 24 on the Strowger switch 7. Therefore, when said switch is mounted on the stand 14, as above described, the terminals 25, wired to the instrumentalities 21 of the switch, and the jack prongs 60, wired to the testing means 16, are connected so the latter means may test the switch.

The switch jack 17, as shown, is affixed to the under face of the accessory bracket 18 which, in turn, is affixed to the sides 46 of the switch stand 14. Lateral extensions 62 of the bracket 18 not only serve to mount accessories, as lights, magnifier light and lens, and the like, but also serve as convenient handles that facilitate handling of the switch stand.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A test stand for a Strowger switch comprising:
   (a) a base,
   (b) a switch stand provided with switch-testing means,
   (c) means mounting said switch stand on the base on pivots on transverse axes whereby the stand is angularly adjustable forward and backward on one axis and rotatively adjustable on the other axis,
   (d) means to connect a Strowger switch to the upper end of the switch stand, and
   (e) means to electrically connect said Strowger switch to the switch-testing means of the switch stand with the switch mounted on the stand.

2. A test stand according to claim 1 provided with a portable mounting base separably connected to the base of the test stand.

3. A test stand according to claim 2 in which the portable mounting base comprises a flat plate adapted for engagement with a support surface, and a pair of clamps affixed to the opposite ends of said plate adapted to clamp said plate on the support surface.

4. A test stand according to claim 1 in which one of said pivot axes is horizontal and the other is vertical, and the adjustable movement of the switch stand on said axes adjustably moves the Strowger switch mounted on said switch stand, accordingly.

5. A test stand according to claim 1 in which:
   (a) the Strowger switch that is mounted on the switch stand has a position that is an upper extension of said switch stand, and
   (b) longitudinally spaced mounting brackets and mounting pins provided on the switch stand to separably engage the Strowger switch when slid from above into the upper end of the switch stand.

6. A test stand according to claim 1 in which the means to electrically connect the Strowger switch and the switch-testing means comprises a multi-prong switch jack carried by the upper end of the switch stand which is wired to the testing means and which is frictionally engaged by a bank of electrical terminals provided on the Strowger switch when the switch is in mounted position on the stand.

7. A test stand according to claim 6 in which:
   (a) a plate spans across the upper end of the switch stand with said switch jack carried thereby, and
   (b) lateral extensions on said spanning plate having the dual purpose of serving as handles for the switch stand and accessory-mounting members.

No references cited.

ROBERT K. SCHAEFER, *Primary Examiner.*

M. GINSBURG, *Assistant Examiner.*